United States Patent [19]

Kemp et al.

[11] Patent Number: 4,574,375
[45] Date of Patent: Mar. 4, 1986

[54] INTERFACE ARRANGEMENT FOR A TELEPHONE SYSTEM OR THE LIKE

[75] Inventors: Michael F. Kemp; Claude J. Champagne, both of Ontario, Canada

[73] Assignee: Northern Telecom Limited, Montreal, Canada

[21] Appl. No.: 541,080

[22] Filed: Oct. 12, 1983

[51] Int. Cl.[4] .................... H04Q 11/04; H04J 3/02
[52] U.S. Cl. ............................... 370/67; 370/85
[58] Field of Search ............ 370/85, 58, 67, 110.1

[56] References Cited

U.S. PATENT DOCUMENTS

| | | | |
|---|---|---|---|
| 3,596,246 | 7/1971 | Nakagome et al. | 370/58 |
| 4,064,360 | 12/1977 | Koenig | 370/58 |
| 4,335,456 | 6/1982 | Gaiser et al. | 370/58 |
| 4,392,221 | 7/1983 | Hesketh | 370/58 |

FOREIGN PATENT DOCUMENTS 0034905 9/1981 European Pat. Off. .
2305907 10/1976 France .
2091068 7/1982 United Kingdom .

OTHER PUBLICATIONS

IEEE, vol. 20, No. 6, Nov. 1982, pp. 15-23, IEEE, New York, U.S., E. A. Munter: "Digital Switch Digitalks".
IBM Technical Disclosure Bulletin, vol. 26, No. 1, Jun. 1983, pp. 267-268, New York, US; M. Demange: "Time-Division Switch Cell Using Associative Memories".
International Switching Symposium, Montreal, Sep. 21st-25th 1981, Session 21B, Paper 4, pp. 1-6, IEEE, New York, US; C. Duret et al., "Experimental Nodal Switching System".
1978 International Zurich Seminar on Digital Communications, Mar. 7-9th 1978, Paper A5, pp. 1-6, IEEE, New York; H. G. Alles, "An Intelligent Network Processor for a Digital Central Office".

Primary Examiner—Douglas W. Olms
Assistant Examiner—Wellington Chin
Attorney, Agent, or Firm—Robert C. Hogeboom

[57] ABSTRACT

An interface scheme is described which allows relatively convenient interconnection of, and re-configuration of, circuits for performing operations to digital signals from a bus. In one exemplary embodiment, a parallel bus, eight bits wide, having 320 channels per frame is provided. For each circuit to be connected to the parallel bus a connection memory and an input/output buffer is provided to control the accessing of the parallel bus by each circuit.

6 Claims, 4 Drawing Figures

INTERFACE ARRANGEMENT FOR A TELEPHONE SYSTEM OR THE LIKE

BACKGROUND OF THE INVENTION

The present invention relates generally to processing digital signals appearing on a bus, and more particularly to a parallel bus arrangement for allowing this to happen in an easily reconfigurable fashion in a telephone system.

In telephone systems, it is becoming more and more common to use digital signals to convey speech information. These digital signals are usually in the form of PCM (pulse code modulation) where a group of binary digits are used to digitally encode a particular range of analogue magnitude values. There digital signals are commonly transmitted in a serial fashion and are commonly processed in some fashion, while in the digital domain. In addition, data, other than digitally encoded speech, can also be conveyed.

It is also common to multiplex a plurality of such digital signals onto a single serial 6us, via a technique referred to as time division multiplexing. Two of the more methods of doing this are to multiplex either 24 or 32 channels onto a single serial bus.

It is also desirable to be able to do some signal processing to these digital signals. As an example, it may be desired to adjust the signal level on certain channels; it may be desired to detect dual tone multi-frequency (DTMF) signalling on the channels; and it may be desired to remove network echos, etc.

In prior art circuits, this processing of the digital signals has been done by extracting the signals for one channel, from a parallel time division multiplexed (TDM) bus, and then passing them to the appropriate circuits for processing. After processing, the digital signals are then returned to an appropriate timeslot (or channel) on the TDM bus. The operation of accessing the bus is under the control of a centralized control device which activates the appropriate circuit at the appropriate time for accessing the bus (i.e. to read from, or write onto, the bus). U.S. Pat. No. 4,295,008 dated Oct. 13, 1981 by A. R. Johnson et al depicts such a centralized scheme (see especially FIG. 8 of that patent and its attendant description).

SUMMARY OF THE INVENTION

According to the present invention, a de-centralized control system is employed to control the accessing of the bus by the appropriate signal processing circuits. This de-centralized accessing is achieved by having one connection memory associated with each signal processing circuit. The connection memories are all responsive both to a common clock signal, and to a common framing signal. Accordingly, each individual processing circuit has its access to the TDM bus controlled by its own dedicated connection memory. If a processing circuit is to be added to the bus (or an existing circuit altered) then, in most cases, only the connection memory associated with that particular processing circuit need be adjusted.

Stated in other terms, the present invention is an interface means for applying information from a channel of a first digital bus to at least one processing circuit and for returning the information, after processing, to a respective channel, the means characterized by: converter means for transforming the digital data on said first bus to digital data on a second digital bus wherein the format of the digital data on the second bus differs from the format of the digital data on the first bus; a plurality of circuit means for selectively accessing the second bus, each circuit means under the control of a respecive connection memory means; each connection memory means responsive to timing signals for controlling the access of an associated circuit means to the second bus such that the associated circuit means accesses the second bus at the appropriate time to receive the digital information from a channel on the second bus, and also accesses the second bus at the appropriate time to transmit the digital information to a selected channel on the second bus.

Stated in yet other terms, the present invention is an interface device for applying information from a channel of a serial digital bus to at least one processing circuit and for returning the information, after processing, to a respecive channel, the device characterized by: serial to parallel converter device for transforming the serial bits from the serial bus to parallel bits on a parallel digital bus; a plurality of circuits for selectively accessing the parallel bus, each circuit under the control of a respective connection memory; each connection memory responsive to timing signals for controlling the access of an associated circuit to the parallel bus such that the associated circuit accesses the parallel bus at the appropriate time to receive the digital information from a selected channel on the parallel bus, corresponding to the channel on the serial bus, and also accesses the parallel bus at the appropriate time to transmit the digital information to a selected channel on the parallel bus, corresponding to the channel on the serial bus.

BRIEF DESCRIPTION OF THE DRAWINGS

The invention will now be described in more detail with reference to the accompanying drawings, wherein like parts in each of the several figures are identified by the same reference character, and wherein.

DETAILED DESCRIPTION

Figure 1:
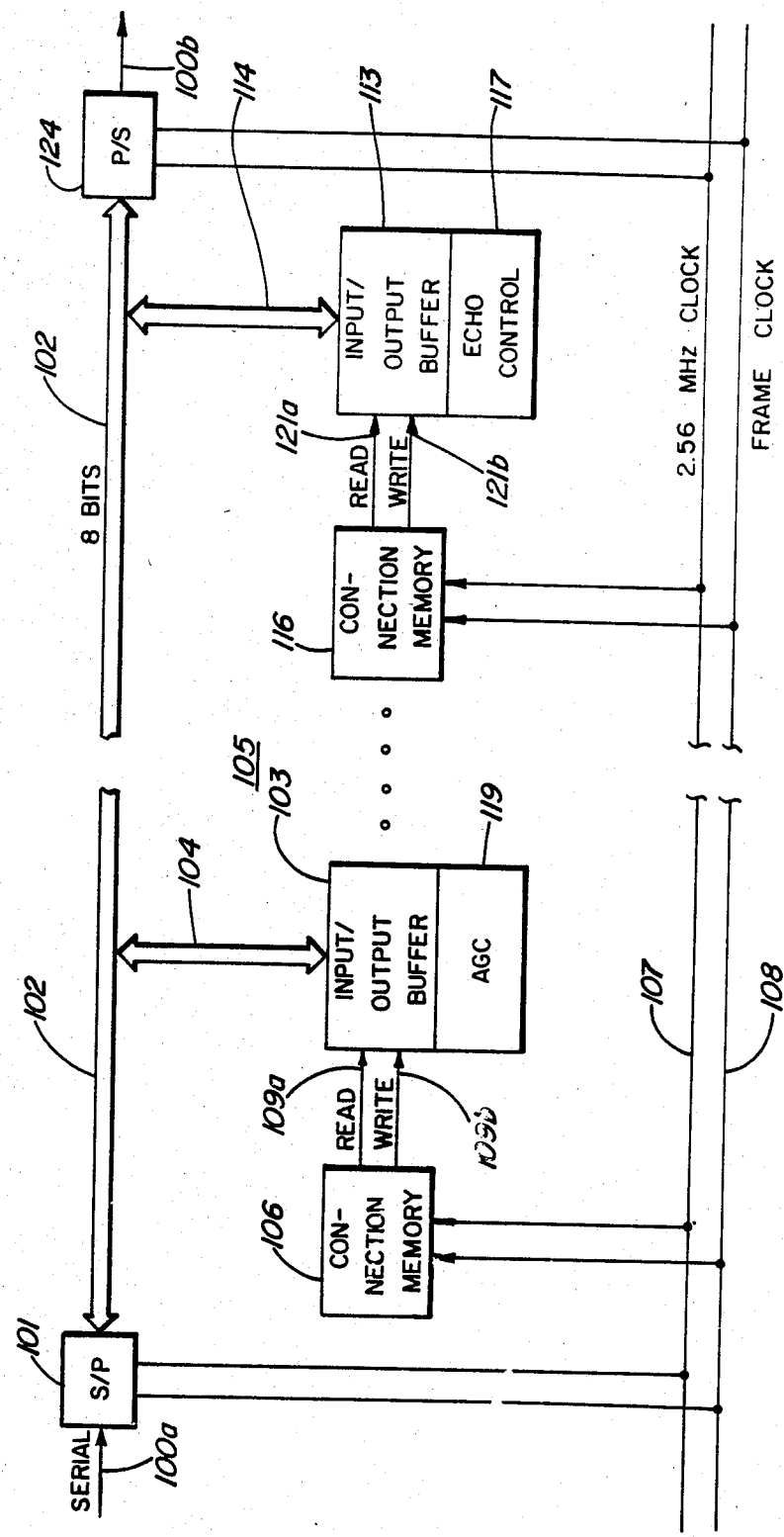
FIG. 1 is a simplified block diagram of a first embodiment of the present invention.

FIG. 1 depicts one embodiment of the present invention in the form of interface circuit 105 (note: circuit 105 includes everything shown in FIG. 1 except serial bus 100a, serial bus 100b, AGC 119, and echo control 117). Serial bus 100a is applied to serial to parallel converter 101 which has as its output 8 bit wide parallel bus 102. Serial bus 100a has 32 channels, each of ten bits and has a frame period of 125 micro-seconds. Parallel bus 102 has 320 channels, each eight bits wide and has a frame period of 125 micro-seconds (note that bus 102 could have been ten bits wide, but for the present application only an eight bit wide bus is needed).

AGC (automatic gain control) circuit 119 is connected to bus 102 via input/output buffer 103 and eight-bit bus 104. Connection memory 106 controls the connection of buffer 103, and consequently AGC 119, to bus 102. Connection memory 106 is responsive both to a 2.56 MHz clock signal on lead 107 and to a framing pulse (occurring once every 125 micro-seconds) on lead 108. The function of connection memory 106 is to control the accessing of bus 102 by buffer 103.

In more detail, connection memory 106 controls when buffer 103 reads data from bus 102 or writes data onto bus 102. This control is via read control lead 109a and write control lead 109b.

Echo control circuit 117 is controlled in an analogous manner to AGC circuit 119. Echo control circuit 117 is connected to bus 102 via input/output buffer 113 and eight-bit bus 114. Connection memory 116 controls the connection of buffer 113 and consequently echo control circuit 117 to bus 102. Connecttion memory 116 is responsive both to a 2.56 MHz clock signal on lead 107 and to a framing pulse (occurring once every 125 micro-seconds) on lead 108. The function of connection memory 116 is to control the accessing of bus 102 by buffer 113.

In more detail, connection memory 116 controls when buffer 113 reads data from bus 102 or writes data onto bus 102. This control is via read control lead 121a and write control lead 121b.

It should be noted that connection memories 106 and 116 function as follows. They count the clock pulses appearing on lead 107 and when they reach a preset count they enable the appropriate control lead. They are reset back to an initial state by the framing pulse appearing on lead 108 (once every 320 cycles of the clock waveform on lead 107).

If desired, parallel bus 102 can be applied to the input of a parallel to serial converter 124. Converter 124 produces a serial output on serial bus 100b of 32 channels per frame, each channel comprising ten bits (eight of which are derived from bus 102). Serial buses 100a and 100b are referred to collectively as bus 100.

Figure 2:
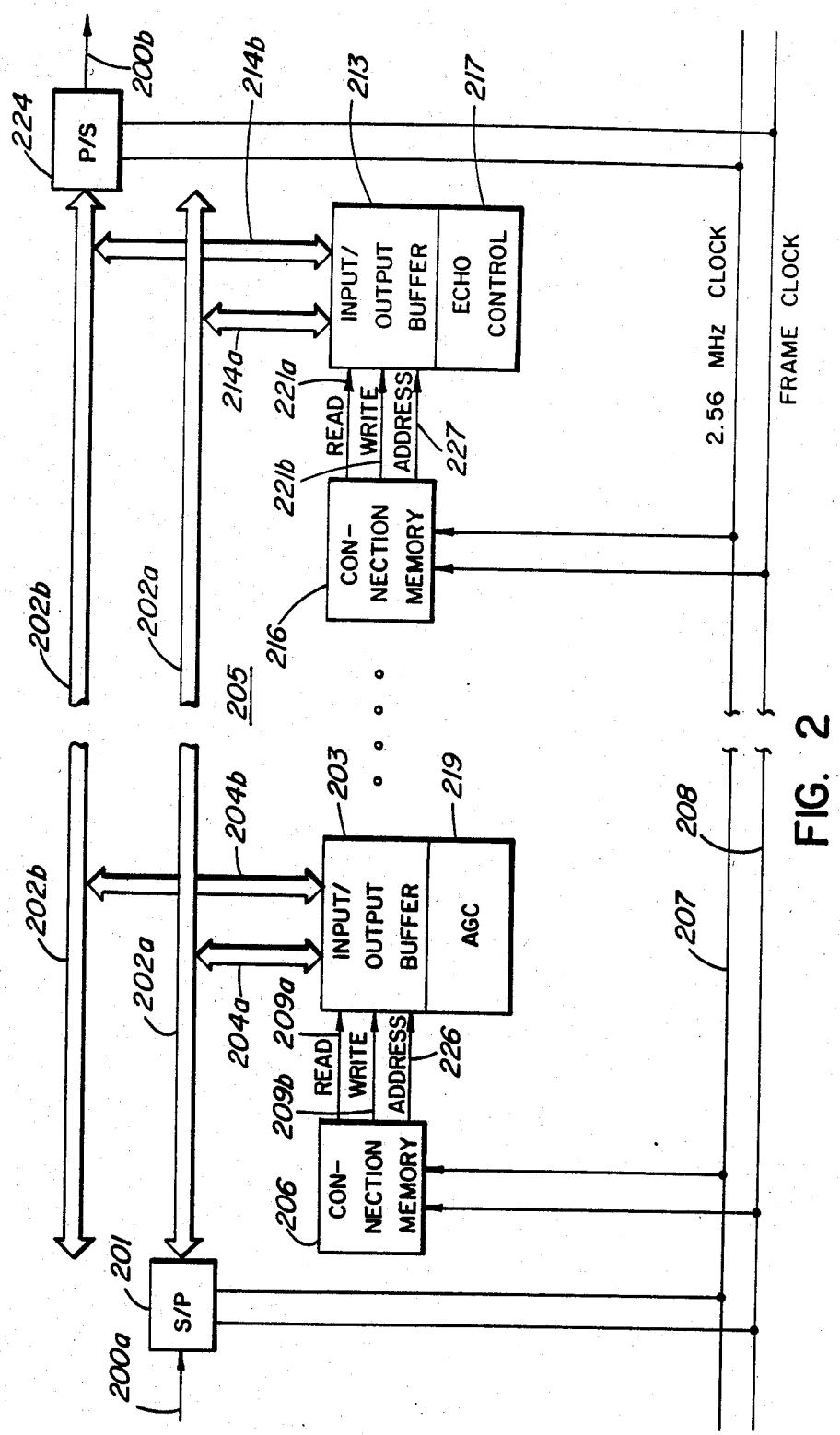
FIG. 2 is a simplified block diagram of a second embodiment of the present invention.

FIG. 2 depicts a second and preferred embodiment of the present invention in the form of interface circuit 205 (note: circuit 205 includes everything shown in FIG. 2 except, bus 200a, bus 200b, AGC 219, and echo control 217). The major difference in the FIG. 2 embodiment is that two parallel buses, 202a and 202b are used instead of the single bus 102 (in FIG. 1). The use of the two parallel buses 202a and 202b results in a doubling of the channel capacity which now becomes 640 channels in the FIG. 2 embodiment. Note that buses 202a and 202b are both bi-directional, and each consists of eight leads.

Serial bus 200a is applied to serial to parallel converter 201 which has as its output eight bit wide parallel bus 202a. Serial bus 200a has 32 channels, each of ten bits and has a frame period of 125 micro-seconds. Parallel bus 202a has 320 channels, each eight bits wide and has a frame period of 125 micro-seconds.

Parallel bus 202b is also an eight bit wide bus, having 320 channels, each of eight bits and has a frame period of 125 micro-seconds. Bus 202b is applied to parallel to serial converter 224 which produces a serial output on serial bus 200b of 32 channels per frame, each channel comprising ten bits (eight of which are derived from bus 202b).

AGC (automatic gain control) circuit 219 is connected to buses 202a and 202b via input/output buffer 203 and eight bit buses 204a and 204b. Port address lead 226 determines which port of buffer 203 is to handle data (i.e. to read data from or write data onto either bus 204a or 204b). Read control lead 209 and write control lead 209b determine, of course, whether or not the operation will be a read (receive) or a write (transmit). Note that buffer 203 can operate in any one of the following modes: (a) read from bus 202a (via bus 204a) and write onto bus 202a (via bus 204a); (b) read from bus 202a (via bus 204a) and write onto bus 202b (via bus 204b); (c) read from bus 202b (via bus 204b) and write onto bus 202b (via bus 204b); and (d) read from bus 202b (via bus 204b) and write onto bus 202a (via bus 204a).

Connection memory 206 controls the connection of buffer 203 and consequently AGC 219 to bus 202a or 202b. Connection memory 206 is responsive both to a 2.56 MHz clock signal on lead 207 and to a framing pulse (occurring once every 125 micro-seconds) on lead 208. The function of connection memory 206 is to control the accessing of bus 202a and 202b by buffer 203.

In more detail, connection memory 206 controls (via read and write control leads 209a and 209b) when buffer 203 either reads data from bus 202a or 202b, or writes data onto bus 202a or 202b; connection memory 206 also controls (via port address lead 226) which bus (ie. 202a or 202b) will be read from or written to.

Echo control circuit 217 is controlled in an analogous manner to AGC circuit 219. Echo control circuit 217 is connected to buses 202a and 202b via input/output buffer 213 and eight bit buses 214a and 214b. Connection memory 216 controls the connection of buffer 213 via read control lead 221, write control lead 221b, and port address lead 227. Memory 216 is responsive both to a 2.56 MHz clock signal on lead 207 and to a framing pulse (occurring once every 125 mirco-seconds) on lead 108.

The functioning of connection memories 206 and 216 is analagous to the functioning of memory 106 in FIG. 1. The sole difference is the existance of port address leads 226 and 227 to determine which bus (i.e. bus 202a or 202b) is to be accessed.

Figure 3:
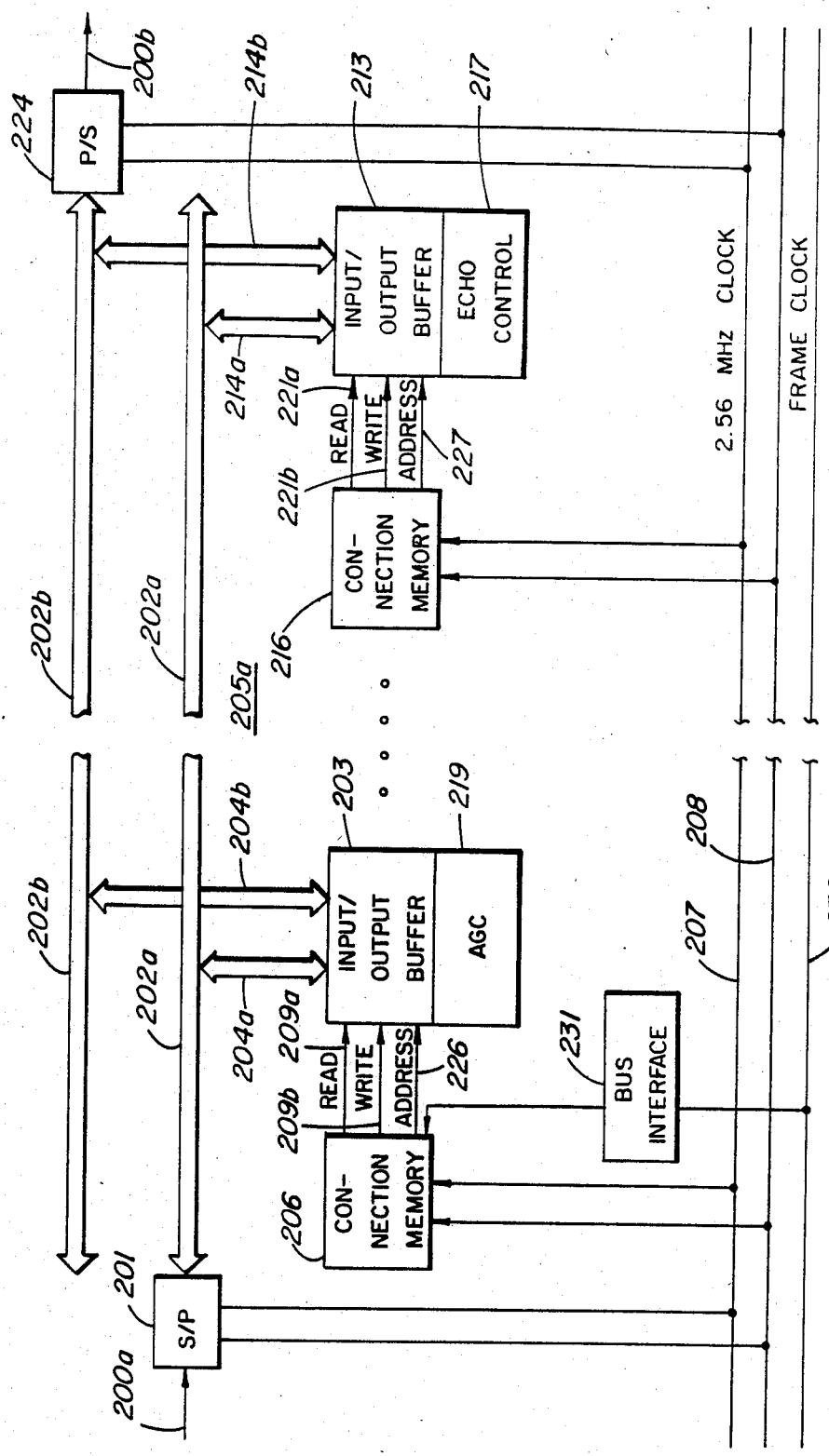
FIG. 3 is similar to FIG. 2 but includes an additional bus and bus interface device.

FIG. 3 depicts yet another embodiment, interface circuit 205a, similar to FIG. 2, but additionally including a bus 230 and a bus interface device 231. The purpose of bus 230 and bus interface device 231 is to enable the contents of connection memory 206 to be modified by signals on bus 230. The signals on bus 230 are applied to connection memory 206 via bus interface device 231, so as to alter the contents stored in connection memory 206 and to consequently change the timeslot during which AGC 219 accesses bus 202a on bus 202b.

Figure 4:
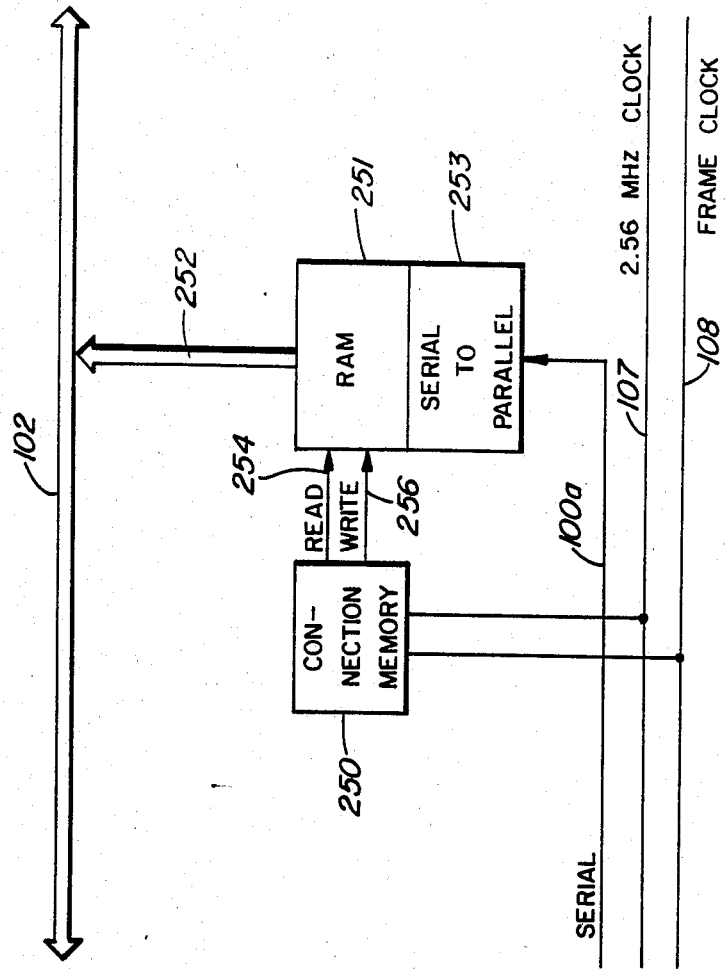
FIG. 4 is similar to FIG. 1 but depicts a further variation, and is further simplified.

FIG. 4 depicts a simplified embodiment for an asynchronous application of a serial to parallel converter. The circuit of FIG. 1 was described as 32 channels on bus 100a and 320 channels on bus 102. But suppose that bus 100a has 24 channels and bus 102 still has 320 channels (all in a 125 micro-second frame); some form of synchronization between the two buses (100a and 102) is required.

Connection memory 250 controls the timing of the operations of serial to parallel converter 253 and RAM 251 so as to put the data on bus 102 at an appropriate time. Data is stored in RAM (random access memory) 251 until it is needed on bus 102. Data is transferred to bus 102 via bus 252. Read lead 254 controls the reading of RAM 251 and consequently the transmitting of digital data from RAM 251 to bus 102. Write lead 256 controls the writing (i.e. receiving) of RAM 251 with digital data from serial to parallel converter 253. Connection memory 250 is responsive to timing signals on leads 107 and 108. The remainder of the circuit (not shown) connected to bus 102 would be as per FIG. 1.

Note also that this same concept can be applied to handle signals received on a bus, in a parallel format, but at a slower rate than the signals on bus 102. In that case a parallel to parallel converter would be used instead of a serial to parallel converter, to convert the parallel signals on the incoming bus to be compatible with the parallel signals on the bus 102.

What is claimed is:

1. An interface means for applying information from a channel of a first digital bus to at least one processing circuit and for returning said information, after processing, to a respective channel, said means characterized by:

a serial to parallel converter means for transforming the digital data on said first bus to parallel digital data on a second digital bus;

a plurality of circuit means for selectively accessing said second bus, each said circuit means under the control of a respective connection memory means;

each said connection memory means responsive to timing signals for controlling the access of an associated circuit means to said second bus such that said associated circuit means accesses said second bus at the appropriate time to receive the digital information from a selected channel on said second bus, and also accesses said bus at the appropriate time to transmit the digital information to a selected channel on said second bus.

2. The interface means of claim 1 wherein said second bus comprises two parallel buses, each n bits wide, which can function both as two parallel buses, each n bits wide, or as one parallel bus, 2n bits wide.

3. An interface means for applying information from a channel of a serial digital bus to at least one processing circuit and for returning said information, after processing, to a respective channel, said means characterized by:

serial to parallel converter means for transforming the serial bits from said serial bus to parallel bits on a parallel digital bus;

a plurality of circuit means for selectively accessing said parallel bus, each said circuit means under the control of a respective connection memory means;

each said connection memory means responsive to timing signals for controlling the access of an associated circuit means to said parallel bus such that said associated circuit means accesses said parallel bus at the appropriate time to receive the digital information from a selected channel on said parallel bus, corresponding to said channel on said serial bus, and also accesses said parallel bus at the appropriate time to transmit the digital information to a selected channel on said parallel bus, corresponding to said channel on said serial bus.

4. The interface means of claim 3 further including a parallel to serial converter means for converting the digital information on said parallel bus to serial digital information on a serial bus.

5. The interface means of claim 3 wherein said serial to parallel converter means includes a connection memory and a data storage means.

6. The interface means of claim 4 wherein said parallel bus comprises 2n leads, n leads of which receive data from said serial to parallel converter means, and n leads carry data to said parallel to serial converter means.

* * * * *